United States Patent
Ito et al.

(10) Patent No.: US 10,273,349 B2
(45) Date of Patent: Apr. 30, 2019

(54) FIBERS FOR USE IN FIBER-REINFORCED RESIN, AND PRODUCTION METHOD THEREOF

(71) Applicant: KURASHIKI BOSEKI KABUSHIKI KAISHA, Kurashiki-shi, Okayama (JP)

(72) Inventors: Masamichi Ito, Neyagawa (JP); Tadaharu Tanaka, Osaka (JP); Wataru Horimoto, Neyagawa (JP)

(73) Assignee: KURASHIKI BOSEKI KABUSHIKI KAISHA, Okayama (JP)

( * ) Notice: Subject to any disclaimer, the term of this patent is extended or adjusted under 35 U.S.C. 154(b) by 428 days.

(21) Appl. No.: 14/775,414

(22) PCT Filed: Mar. 11, 2014

(86) PCT No.: PCT/JP2014/056285
§ 371 (c)(1),
(2) Date: Sep. 11, 2015

(87) PCT Pub. No.: WO2014/142109
PCT Pub. Date: Sep. 18, 2014

(65) Prior Publication Data
US 2016/0024282 A1     Jan. 28, 2016

(30) Foreign Application Priority Data

Mar. 12, 2013  (JP) ................................ 2013-049359
May 27, 2013   (JP) ................................ 2013-111140

(51) Int. Cl.
| | | |
|---|---|---|
| C08K 9/04 | (2006.01) |
| D06M 11/34 | (2006.01) |
| D06M 10/00 | (2006.01) |
| D06M 10/02 | (2006.01) |
| C08K 7/06 | (2006.01) |
| C08J 5/06 | (2006.01) |
| C08J 5/08 | (2006.01) |
| C03C 25/607 | (2018.01) |
| C03C 25/6226 | (2018.01) |
| C03C 25/6293 | (2018.01) |
| C03C 25/6208 | (2018.01) |
| C03C 25/36 | (2006.01) |
| D06M 101/40 | (2006.01) |

(52) U.S. Cl.
CPC ............... *C08K 9/04* (2013.01); *C03C 25/36* (2013.01); *C03C 25/607* (2013.01); *C03C 25/6208* (2018.01); *C03C 25/6226* (2013.01); *C03C 25/6293* (2013.01); *C08J 5/06* (2013.01); *C08J 5/08* (2013.01); *C08K 7/06* (2013.01); *D06M 10/001* (2013.01); *D06M 10/025* (2013.01); *D06M 11/34* (2013.01); *D06M 2101/40* (2013.01)

(58) Field of Classification Search
CPC ... C08K 9/04; C08K 5/06; C08K 5/08; C08K 7/06; C08M 11/34; C08M 10/001; C08M 10/025; C08J 5/08; C08J 5/06; C03C 25/36; C03C 25/607; C03C 25/6226; C03C 25/6233; C03C 25/6293; D06M 2101/40

See application file for complete search history.

(56) References Cited

U.S. PATENT DOCUMENTS

| | | | | |
|---|---|---|---|---|
| 3,634,220 A | * | 1/1972 | Goan ..................... | B29B 15/08 204/164 |
| 3,723,607 A | * | 3/1973 | Kalnin .................. | B29B 15/08 264/82 |
| 4,364,993 A | * | 12/1982 | Edelman .................. | C08J 5/06 156/330 |
| 5,185,188 A | * | 2/1993 | Abe ...................... | B29C 59/005 264/446 |
| 6,027,786 A | * | 2/2000 | Ford ...................... | B29B 15/08 156/242 |
| 8,318,264 B2 | | 11/2012 | Moireau et al. | |
| 2002/0007022 A1 | | 1/2002 | Oosedo et al. | |

(Continued)

FOREIGN PATENT DOCUMENTS

| CN | 1242792 | 1/2000 |
|---|---|---|
| CN | 101367990 | 2/2009 |

(Continued)

OTHER PUBLICATIONS

Derwent 1983-11350K Kariya et al. 1986.*
Meiners, et al., "Modifying Glass Fiber Size by Plasma Treatment", Journal of Adhesion Science and Technology, vol. 26, No. 10-11, 2012, pp. 1611-1627.
Office Action issued in corresponding Japanese Patent Application No. 2013-049359, dated Apr. 12, 2016, 3 pages.

(Continued)

*Primary Examiner* — Amina S Khan
(74) *Attorney, Agent, or Firm* — Hamre, Schumann, Mueller & Larson, P.C.

(57) ABSTRACT

Fibers for fiber-reinforced resin of the present invention are fibers for fiber-reinforced resin to which a sizing agent is adhered. The fibers are at least one selected from carbon fibers and glass fibers, and an ester bond (—COO—) generated by denaturation of the sizing agent is present on surfaces of the fibers. A method for producing the same according to the present invention includes: subjecting fibers to which a sizing agent is adhered to at least one treatment selected from the group consisting of ozone oxidation, ultraviolet irradiation at a wavelength of 400 nm or less, and a plasma treatment. The fibers are at least one selected from carbon fibers and glass fibers. Thus, it is possible to provide carbon fibers having enhanced wettability to a matrix resin and thereby allowing the matrix resin to be impregnated between the fibers easily.

7 Claims, 9 Drawing Sheets

(56) References Cited

U.S. PATENT DOCUMENTS

| | | | |
|---|---|---|---|
| 2003/0224132 A1* | 12/2003 | Han | B82Y 30/00 428/36.9 |
| 2009/0048389 A1 | 2/2009 | Lee et al. | |
| 2009/0075078 A1 | 3/2009 | Yano et al. | |
| 2015/0152590 A1* | 6/2015 | Knox | C08J 5/06 428/36.92 |

FOREIGN PATENT DOCUMENTS

| | | |
|---|---|---|
| EP | 0 640 702 | 3/1995 |
| JP | 7-279040 | 10/1995 |
| JP | 2000-355883 | 12/2000 |
| JP | 2000-355884 | 12/2000 |
| JP | 2000355883 A * | 12/2000 |
| JP | 2002-013069 | 1/2002 |
| JP | 2005-146429 | 6/2005 |
| JP | 2009-079344 | 4/2009 |
| JP | 2009-197143 | 9/2009 |
| WO | 2006/011785 | 2/2006 |

OTHER PUBLICATIONS

"Seni Binran (Fiber Handbook), 3rd edition" edited by The Society of Fiber Science and Technology, Japan, published by Maruzen, Dec. 15, 2004, pp. 598-601, 614-615, with a partial translation.

Extended European Search Report issued in corresponding European patent application, dated Aug. 8, 2016, 7 pages.

Office Action issued in corresponding Chinese patent application, dated Aug. 3, 2016, 7 pages.

Ma, et al., "A Study of the Effect of Oxygen Plasma Treatment on the Interfacial Properties of Carbon Fiber/Epoxy Composites", Journal of Applied Polymer Science, vol. 118, Jun. 3, 2010, pp. 1606-1614.

Office Action issued in corresponding European Patent Application No. 14763068.5, dated Nov. 16, 2017, 8 pages.

* cited by examiner

FIBERS FOR USE IN FIBER-REINFORCED RESIN, AND PRODUCTION METHOD THEREOF

TECHNICAL FIELD

The present invention relates to fibers for fiber-reinforced resin with an improved resin impregnation property, and a method for producing the same.

BACKGROUND ART

Carbon fiber-reinforced plastics (CFRP) are applied widely to various sporting goods such as golf club shafts and fishing rods, airplanes, automobiles, pressure vessels, and the like, by making good use of their characteristics such as high strength and light weight, and are expected for future applications. The fiber-reinforced plastics are molded into a target molded product by a general molding method, including a contact pressure molding method such as a hand lay-up method and a spray-up method, a filament winding (FW) method, a drawing method, and a continuous molding method such as a continuous lamination method. A matrix resin used is a thermosetting resin such as an epoxy resin. To increase a binding force with a matrix resin, a sizing agent appropriate for the matrix resin is applied to the surface of reinforcing fibers (above, Non-Patent Document 1).

As conventional techniques, Patent Document 1 proposes the use of a sizing agent for carbon fibers that contains an acrylic group and an epoxy group. Patent Document 2 proposes subjecting the surface of carbon fibers to ozone oxidation before application of a sizing agent. Patent Documents 3 and 4 propose the use of a sizing agent for carbon fibers that contains an epoxy group.

PRIOR ART DOCUMENTS

Patent Documents

Patent Document 1: JP 2000-355884 A
Patent Document 2: JP 2009-79344 A
Patent Document 3: JP 1995(H7)-279040 A
Patent Document 4: JP 2005-146429 A

Non-Patent Document

Non-Patent Document 1: "Seni Binran (Fiber Handbook), $3^{rd}$ edition" edited by The Society of Fiber Science and Technology, Japan, published by Maruzen, Dec. 15, 2004, pages 598-601, 614-615

DISCLOSURE OF INVENTION

Problem to be Solved by the Invention

However, since the carbon fibers to which a conventional sizing agent is applied have a smaller diameter than glass fibers, they are less likely to be impregnated with a matrix resin as compared with glass fibers. Glass fibers also have been demanded to increase the resin impregnation property further.

To solve the above conventional problems, the present invention provides fibers for reinforcing resin having enhanced wettability to a matrix resin and thereby allowing the matrix resin to be impregnated between the fibers easily, and a method for producing the same.

Means for Solving Problem

Fibers for fiber-reinforced resin of the present invention are fibers for fiber-reinforced resin to which a sizing agent is adhered. The fibers are at least one selected from carbon fibers and glass fibers, and an ester bond (—COO—) generated by denaturation of the sizing agent is present on surfaces of the fibers.

A method for producing fibers for fiber-reinforced resin of the present invention includes: subjecting fibers to which a sizing agent is adhered to at least one treatment selected from the group consisting of ozone oxidation, ultraviolet irradiation at a wavelength of 400 nm or less, and a plasma treatment, thereby increasing a matrix resin impregnation property of the fibers. The fibers are at least one selected from carbon fibers and glass fibers.

Effect of the Invention

In the present invention, the presence of the ester bond (—COO—) generated by denaturation of the sizing agent on the surface of the carbon fibers to which the sizing agent is applied enhances wettability to a matrix resin. Thus, it is possible to provide carbon fibers that allow a matrix resin to be impregnated between the carbon fibers easily and accordingly shorten an impregnation step.

In the production method of the present invention, the fibers to which the sizing agent is applied are subjected to at least one treatment selected from the group consisting of ozone oxidation, ultraviolet irradiation at a wavelength of 400 nm or less such as excimer lamp irradiation and low-pressure mercury lamp irradiation, and plasma irradiation, whereby the fibers can have enhanced wettability to a matrix resin. Thus, it is possible to provide carbon fibers that allow a matrix resin to be impregnated between the fibers easily. Further, also as to glass fibers, a sizing agent often is applied thereto to increase an affinity for resin. Although the glass fibers have a higher resin impregnation property than the carbon fibers, an impregnation step can be shortened by further increasing a resin impregnation property.

DESCRIPTION OF THE INVENTION

To increase an affinity for resin, general carbon fibers are marketed in a state in which an epoxy resin sizing agent is applied thereto. In the present invention, such commercially available carbon fibers to which an epoxy resin sizing agent is applied are subjected to at least one treatment selected from the group consisting of ozone oxidation, ultraviolet irradiation at a wavelength of 400 nm or less such as excimer lamp irradiation and low-pressure mercury lamp irradiation, and plasma irradiation. By this treatment, the sizing agent is activated and an ester bond (—COO—) is generated, whereby the fibers can have favorable wettability to a matrix resin and have an increased resin impregnation property.

In many cases, glass fibers also are marketed in a state in which a sizing agent is applied thereto to increase an affinity for resin. Although the glass fibers have a higher resin impregnation property than the carbon fibers, they also are subjected to at least one treatment selected from the group consisting of ozone oxidation, ultraviolet irradiation at a wavelength of 400 nm or less such as excimer lamp irradiation and low-pressure mercury lamp irradiation, and plasma irradiation of the present invention. By this treatment, the glass fibers can have a higher resin impregnation property, whereby an impregnation step can be shortened.

The ester bond can be measured by, e.g., X-ray photoelectron spectroscopy. A more specific measurement method will be described in Examples.

The carbon atom concentration of the ester bond is preferably 1.0% or more, more preferably 5.0% or more, and further preferably 7.0% or more with respect to the total carbon atom concentration of the fibers. Within the above range, the fibers can have further favorable wettability to a matrix resin and have a further increased resin impregnation property.

The ester bond is generated by activating the surface of carbon fibers or glass fibers to which an epoxy resin sizing agent containing an ester bond in a proportion of less than 1.0% with respect to the total carbon atom concentration of the fibers is applied. More preferably, carbon fibers or glass fibers to which an epoxy resin sizing agent without ester bond is applied are subjected to at least one treatment selected from the group consisting of ozone oxidation, ultraviolet irradiation at a wavelength of 400 nm or less such as excimer lamp irradiation and low-pressure mercury lamp irradiation, and plasma irradiation. By this treatment, the sizing agent is activated and an ester bond (—COO—) is generated, thereby allowing the fibers to have favorable wettability to a matrix resin and have an increased resin impregnation property.

(1) Ozone Oxidation

Examples of the ozone generation method include a silent discharge system, a creeping discharge system, an ultraviolet irradiation system, and an electrolysis system. In terms of efficiently generating a large amount of ozone, mainly the silent discharge system is used. At present, the silent discharge system is used most commonly as a discharge-type ozonizer. A dielectric (mainly glass or ceramics) layer is formed on one or both of a pair of parallel electrodes and a high AC voltage is applied between the electrodes to generate silent discharge. The ozone concentration is, e.g., 40000 ppm. The treatment time is preferably 2 to 30 minutes.

(2) Excimer Lamp Irradiation

An excimer lamp is a discharge lamp that emits light from excimers formed from rare gas atoms, rare gas atoms and halogen atoms, or the like, by making good use of its characteristic of generating a lot of short-time discharge of dielectric barrier discharge. Typical examples of the radiation wavelength of the excimer lamp include $Ar_2^*$ (126 nm), $Kr_2^*$ (146 nm), $Xe_2^*$ (172 nm), $KrCl^*$ (222 nm), and $XeCl^*$ (308 nm). The excimer lamp is a double-structured quartz glass, which includes a metallic electrode inside an inner tube and a metallic mesh electrode outside an outer tube. The quartz glass tube is filled with discharge gas. By applying a high AC voltage between the electrodes, a lot of thin wire-like discharge plasma (dielectric barrier discharge) are generated between the two dielectrics. This discharge plasma contains high-energy electrons, and has a characteristic of extinguishing instantly. The atoms of discharge gas are excited by this discharge plasma, thereby being brought into an excimer state instantly. In the transition from the excimer state to the original state (ground state), a spectrum peculiar to the excimer is emitted (excimer light emission). The emission spectrum can be set by the type of discharge gas to be filled.

The preferable irradiation conditions differ depending on the wavelength. When the wavelength is 172 nm and the light intensity is, e.g., 5 to 6 $mW/cm^2$, the irradiation time is preferably about 0.5 to 30 minutes. When the wavelength is 222 nm and the light intensity is, e.g., 40 to 60 $mW/cm^2$, the irradiation time is preferably about 2 to 30 minutes. If there is an air layer (gap) between the lamp and an object to be treated, in the case of the wavelength of 172 nm, oxygen in air absorbs light energy, whereby ozone is generated. Therefore, oxidation action by ozone also occurs.

(3) Low-Pressure Mercury Lamp Irradiation

A low-pressure mercury lamp (low-pressure UV lamp) utilizes light emission of arc discharge in mercury vapor at a mercury pressure of 100 Pa or less during lighting. In an arc tube, rare gas (e.g., argon gas) and mercury or mercury amalgam are sealed. An example of the low-pressure mercury lamp is an ultraviolet radiation lamp with wavelengths of 185 nm and 254 nm. The light intensity is, e.g., 40 to 60 $mW/cm^2$. The irradiation time is preferably about 2 to 30 minutes.

(4) Plasma Irradiation Treatment

Plasma is generally a state of matter in which molecules constituting gas are partially or fully ionized and separated into cations and electrons that move freely. The following are preferable conditions for subjecting carbon fibers to plasma irradiation using a plasma treatment device: irradiation dose in terms of watt density ($W \cdot min/m^2$): 1000 to 50000 $W \cdot min/m^2$; and a treatment speed (moving speed of an object to be treated): 0.05 to 1 m/min under an atmosphere of nitrogen gas or nitrogen+oxygen gas.

The above treatments may be performed alone or in any combination. By these treatments, the sizing agent on the fiber surface is activated, thereby allowing the fibers to have further favorable wettability to a matrix resin and have a further increased resin impregnation property. More specifically, it is believed that the sizing agent is activated by cleavage of molecules of the sizing agent, or by formation of a hydroxy group, a carbonyl group, a carboxyl group, an ammonium group, or an intermediate or an analogous group of these in a transition state. The degree of activation of the sizing agent on the fiber surface can be evaluated by a contact angle with water.

The fibers may be in the form of a single fiber, or aligned in at least one direction. The single fiber may have any fineness.

The fibers may be formed into a sheet shape, examples of which include a reed screen-like base material in which constituent fibers are aligned in one direction, a woven fabric, a knitted fabric, a braiding, and a multiaxial warp knitted fabric.

In the present invention, it is preferable to use carbon fibers to the surface of which a versatile epoxy resin sizing agent is applied. The adhesion amount of the sizing agent is preferably 0.1 to 5.0 wt %, and more preferably 0.2 to 3.0 wt %.

The matrix resin may be a thermosetting resin, examples of which include an epoxy resin, an unsaturated polyester resin, and a phenol resin.

Figure 1:
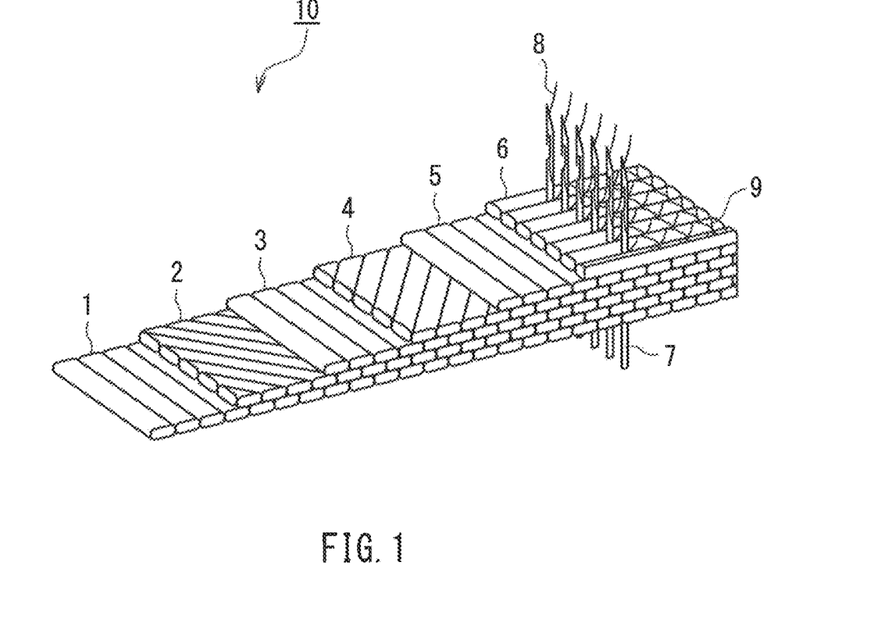
FIG. 1 is a schematic perspective view of a multiaxial warp knitted fabric in an embodiment of the present invention.

Next, the present invention will be explained using drawings. FIG. 1 is a perspective view of a fiber sheet 10 in an embodiment of the present invention. The fiber sheet 10 shows a schematic view of a multiaxial warp knitted fabric. Carbon fibers or glass fibers 1 to 6, to which a sizing agent is adhered, are subjected to the activation treatment of the present invention in advance, or they are firstly formed into a fiber sheet and thereafter subjected to the activation treatment. Fiber bundles composed of a plurality of fibers are aligned in parallel in one direction to form the fiber sheet 10. As shown in FIG. 1, the fibers 1 to 6 are stacked in a plurality of directions, and stitched (bound) in a thickness direction with stitching yarns 8 and 9 threaded through a knitting needle 7 so as to be integrated. Such a multiaxial warp knitted fabric as the fiber sheet 10 is integrated with a matrix resin. With this multiaxial stacked sheet, it is possible to provide a fiber-reinforced resin having an excellent reinforcing effect in multiple directions. The stitching yarns may be replaced by thermal adhesive yarns or used in combination with a binder.

EXAMPLES

Hereinafter, the present invention will be described specifically by way of examples. The present invention is not limited to the following examples.

<Various Analyses, Measurement Methods>

1. X-Ray Photoelectron Spectroscopy (XPS)

Device Used: Quantum-2000, Scanning-type X-ray photoelectron spectroscope manufactured by ULVAC-PHI, Inc.

Measurement Conditions:

X-ray source: Al Kα (monochrome: 20 W, 15 kV)

Analysis region: 100 μmϕ

Electrostatic charge neutralization mechanism (electron beams+ion beams)

Before measurement, specimens were cut into appropriate size and fixed to a holder using a Mo mask.

2. Fiber Reinforcement Resin Impregnation Test

Figure 2:
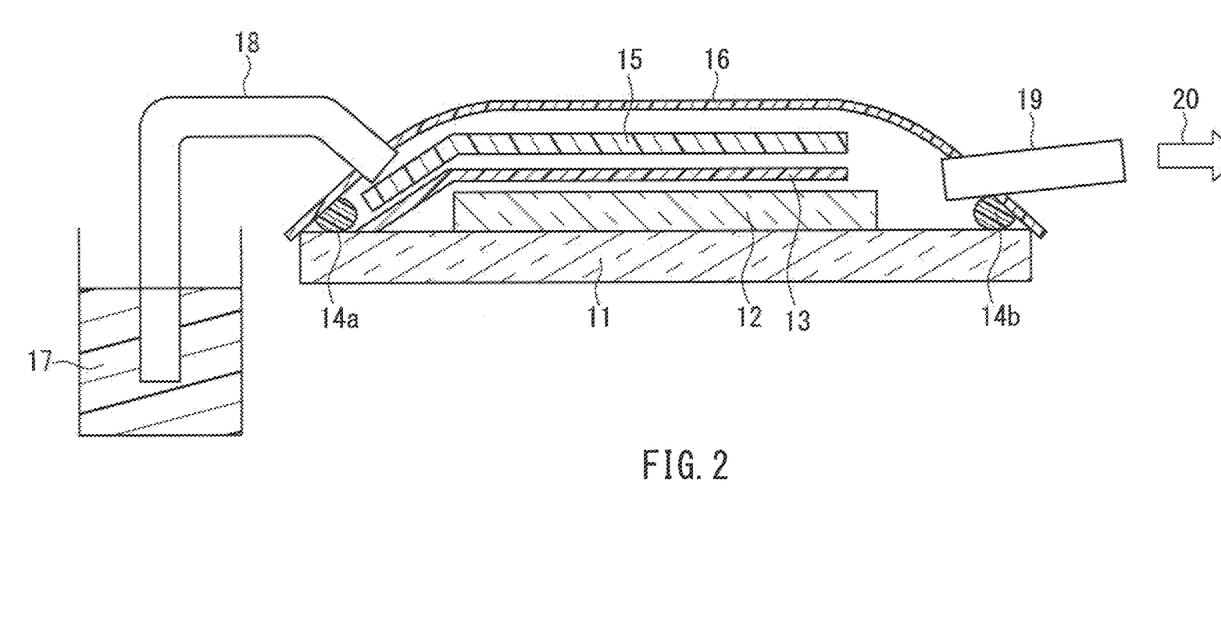
FIG. 2 is a schematic diagram illustrating infusion molding in an embodiment of the present invention.

Untreated opened yarns, ozone-treated opened yarns, and excimer-treated opened yarns were each arranged in a size of about 14 cm wide and 10 cm long on a glass plate to form a sheet, and 20 sheets thereof were stacked in the same direction to prepare a base having a weight per unit area of about 1900 g/m$^2$. In accordance with ordinary infusion molding shown in FIG. 2, a glass plate 11 was surrounded by sealants 14a and 14b. A separation film 13, a media sheet 15, and a film 16 were stacked on a base 12 and sealed. Evacuation was performed from an outlet 19 provided on one side in a length direction to an arrow direction 20 at a constant vacuum, and a matrix resin 17 was caused to flow therein from a supply port 18 on the other side. A resin impregnated area (%) in accordance with a lapse of time was observed from the undersurface of the glass plate 11.

Matrix Resin: epoxy-based resin (manufactured by Huntsman International LLC.)

Main Agent: Araldaite LY1564SP: 100 parts by weight

Curing Agent: Aradur 3416: 34 parts by weight

The above ingredients were mixed (viscosity: 200 to 320 mPa·s (25° C.)).

<Carbon Fibers>

Carbon fibers having a shape of large tow filament and a single fiber fineness of 7 μm were used. As the sizing agent, an epoxy resin was applied to the carbon fibers.

Comparative Example 1

The above carbon fibers (opened yarns) opened in a strip shape were used as untreated carbon fibers. The weight per unit area was about 94 g/m$^2$.

Example 1

Example 1 is an exemplary ozone oxidation treatment. The above untreated opened yarns (width: about 3 cm, length: about 10 cm) were placed in a desiccator. After creating a vacuum, the yarns were subjected to the ozone oxidation treatment by brining them into contact with an ozone atmosphere (concentration: 40000 ppm) for 30 minutes. The ozone production capacity was about 6 g/h in total using three ozone generators manufactured by REGAL JOINT Co., Ltd. (model: ORZ-3.2, production method: silent discharge), each unit having an ozone production capacity of 2.16 g/h (voltage: 100V, oxygen gas concentration: 90%, flow rate: 1 L/min).

Example 2

Example 2 is an exemplary excimer treatment. The above untreated opened yarns (width: about 3 cm, length: about 10 cm) were placed in a row in parallel on a quartz glass plate of an excimer lamp irradiation device. The front and back surfaces of the yarns were each irradiated with a xenon lamp (wavelength: 172 nm) with light intensity of 5.5 mW/cm$^2$ for 5 minutes (10 minutes in total). The excimer irradiation device used was manufactured by USHIO Inc., model: H0011.

The carbon fibers obtained in Comparative Example 1 and Examples 1-2 were analyzed by X-Ray Photoelectron Spectroscopy (XPS).

Figure 3:
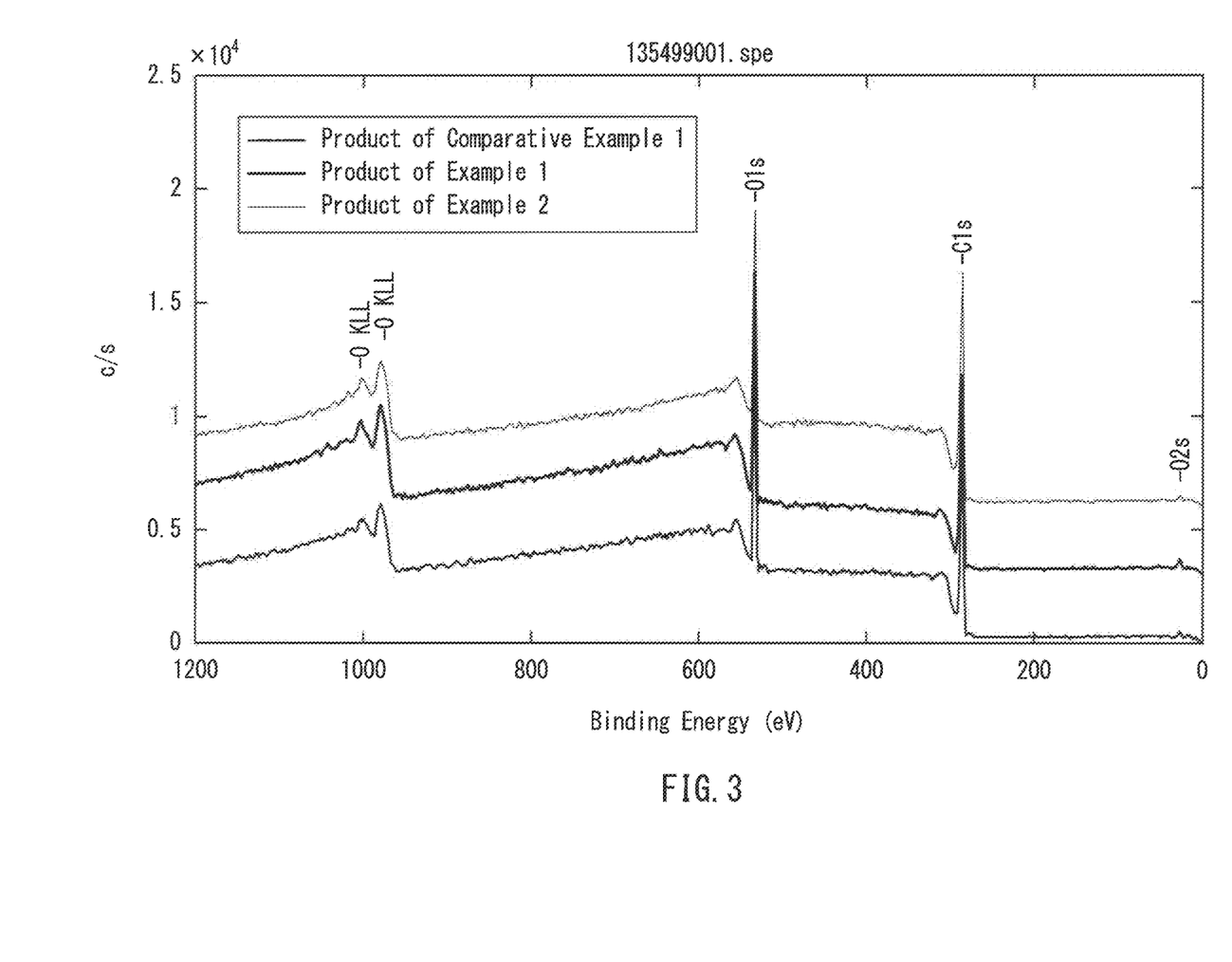
FIG. 3 is an overlay graph showing wide spectra of products of Example 1 and 2 of the present invention and a wide spectrum of a product of Comparative Example 1 measured by X-ray photoelectron spectroscopy.

(1) FIG. 3 shows wide spectra of the respective specimens. As can be seen from FIGS. 3, C and O were detected in the respective spectra, and no other peculiar elements were detected.

Figure 4:
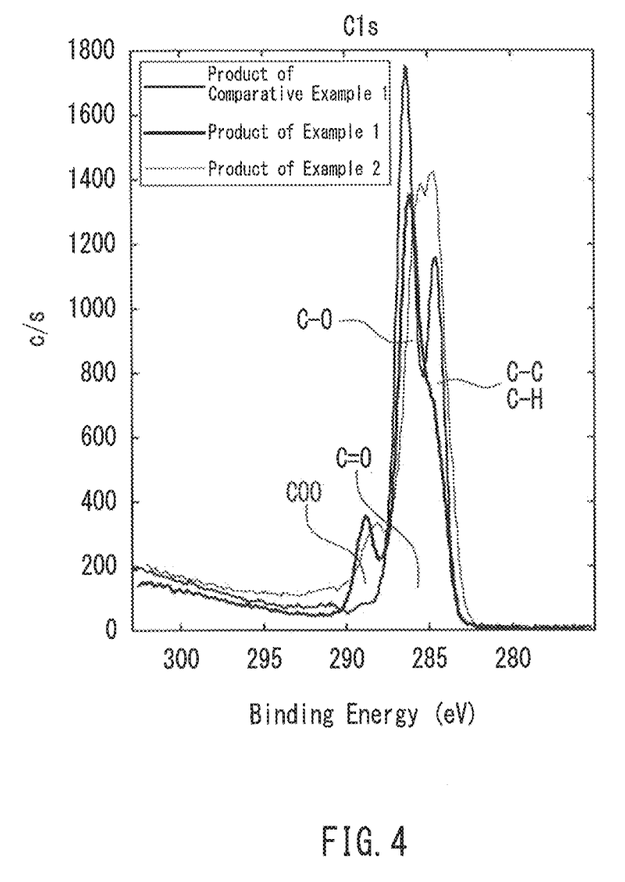
FIG. 4 is an overlay graph showing narrow spectra of the same.
Figure 5:
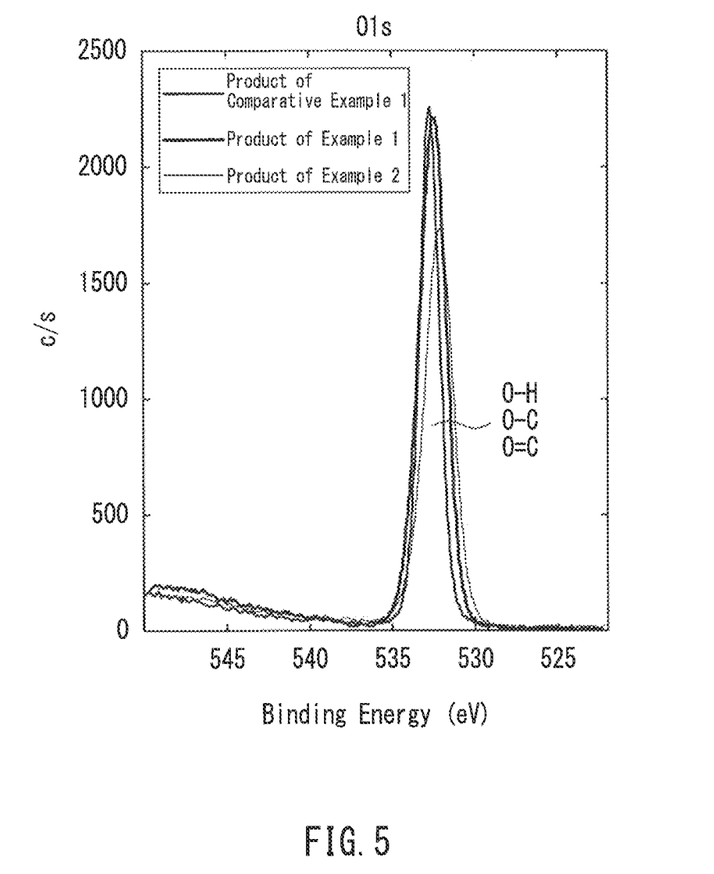
FIG. 5 is an overlay graph showing narrow spectra of the same.

(2) FIGS. 4 and 5 show narrow spectra of the respective elements. Table 1 shows the surface atom concentrations (at %) of the respective specimens estimated from the peak intensities of the respective elements. FIGS. 4 and 5 also indicate binding states estimated from binding energies of the respective peaks. Incidentally, a handbook issued by ULVAC-PHI, Inc., was referred so as to identify the respective states. As can be seen from these, in the product of Example 1, more oxygen atoms (O) were detected as compared with the other specimens. On the other hand, it can be seen from changes in C1s spectra that, in the product of Comparative Example 1, a binding state C—O was observed in addition to binding states C—C, C—H, whereas in the products of Examples 1-2, binding states C=O, —COO— were observed besides these. The relative sensitivity factors of ULVAC-PHI, Inc., were used for calculation of the surface atom concentrations.

Figure 6:
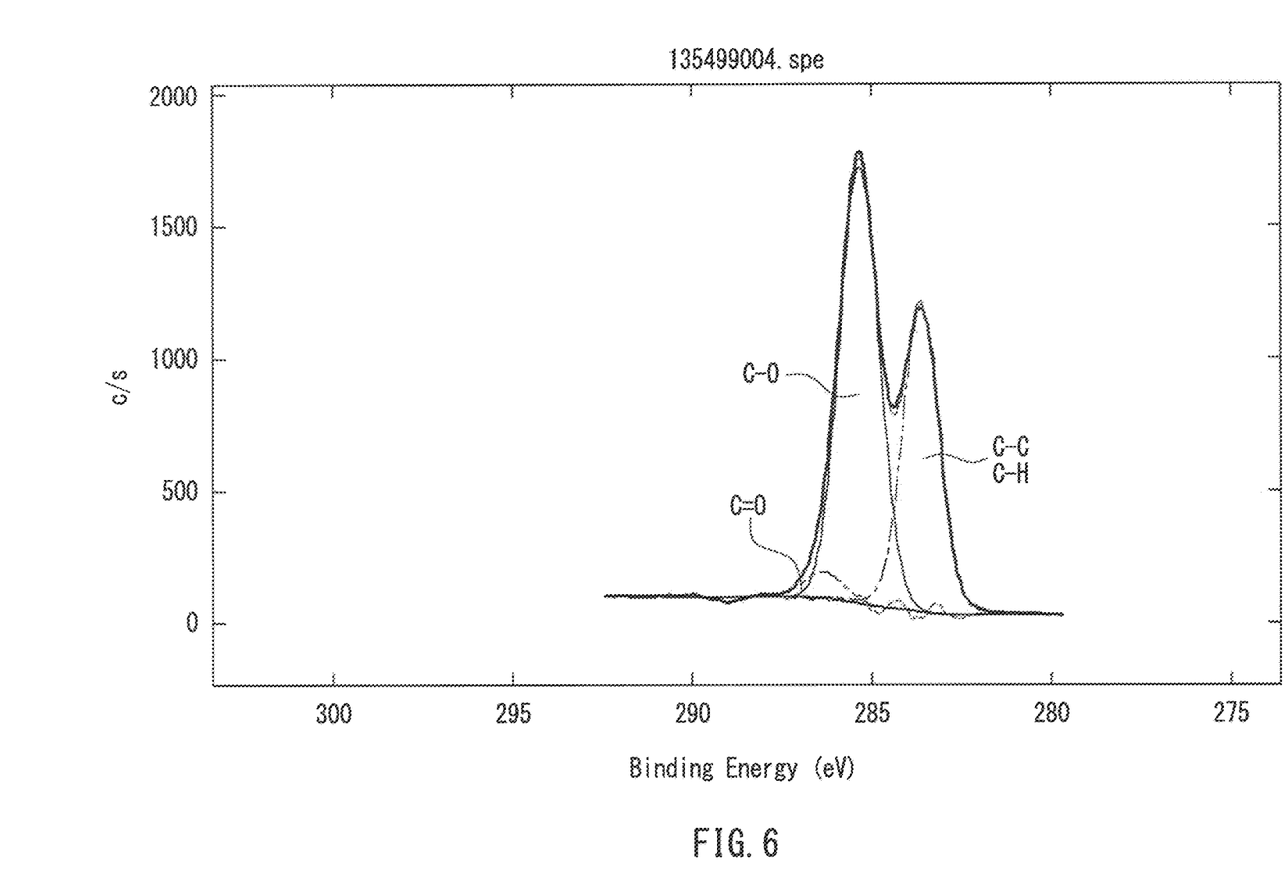
FIG. 6 is analysis data of C1s spectra of the product of Comparative Example 1 measured by X-ray photoelectron spectroscopy.
Figure 7:
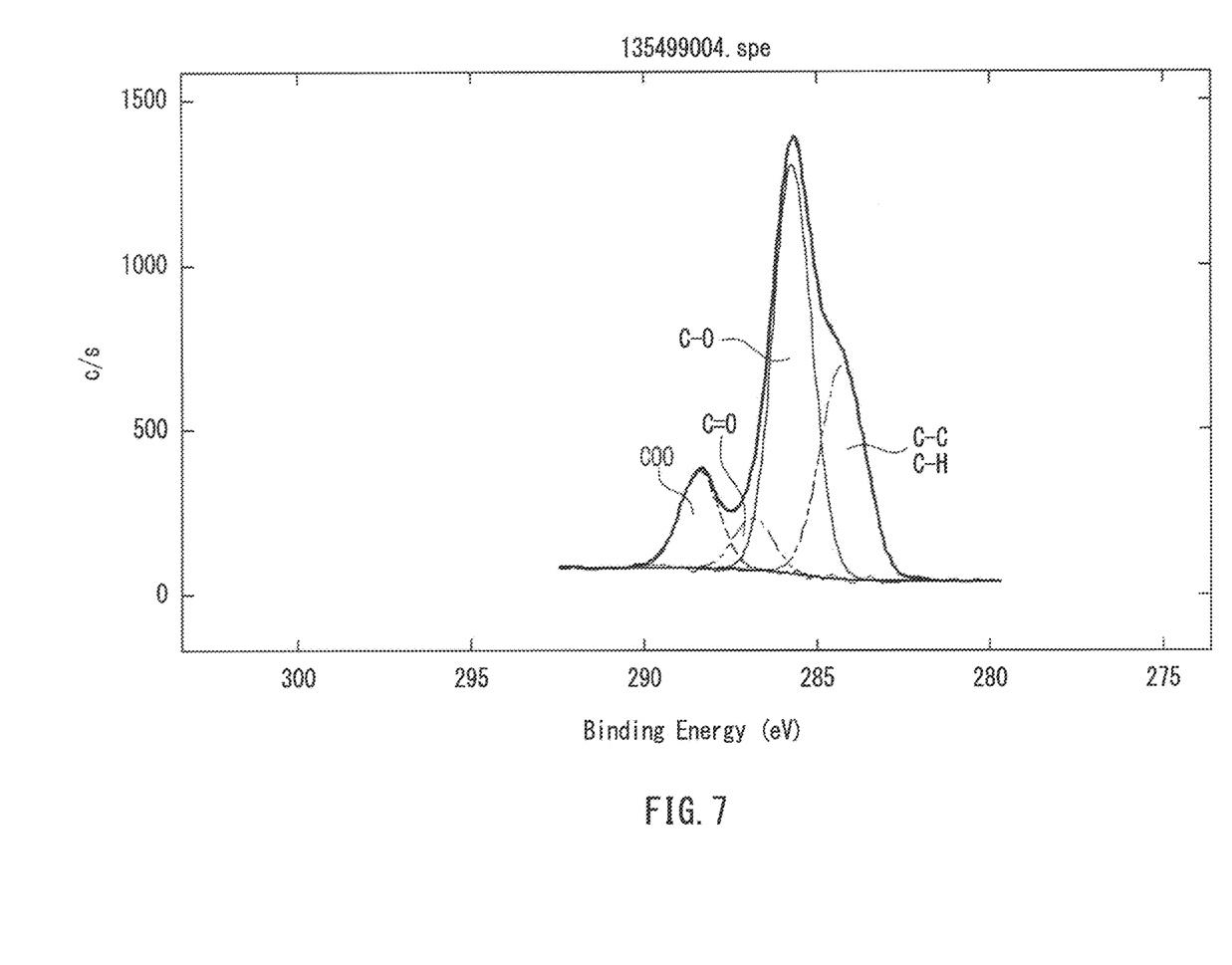
FIG. 7 is analysis data of C1s spectra of the product of Example 1 of the present invention measured by X-ray photoelectron spectroscopy.
Figure 8:
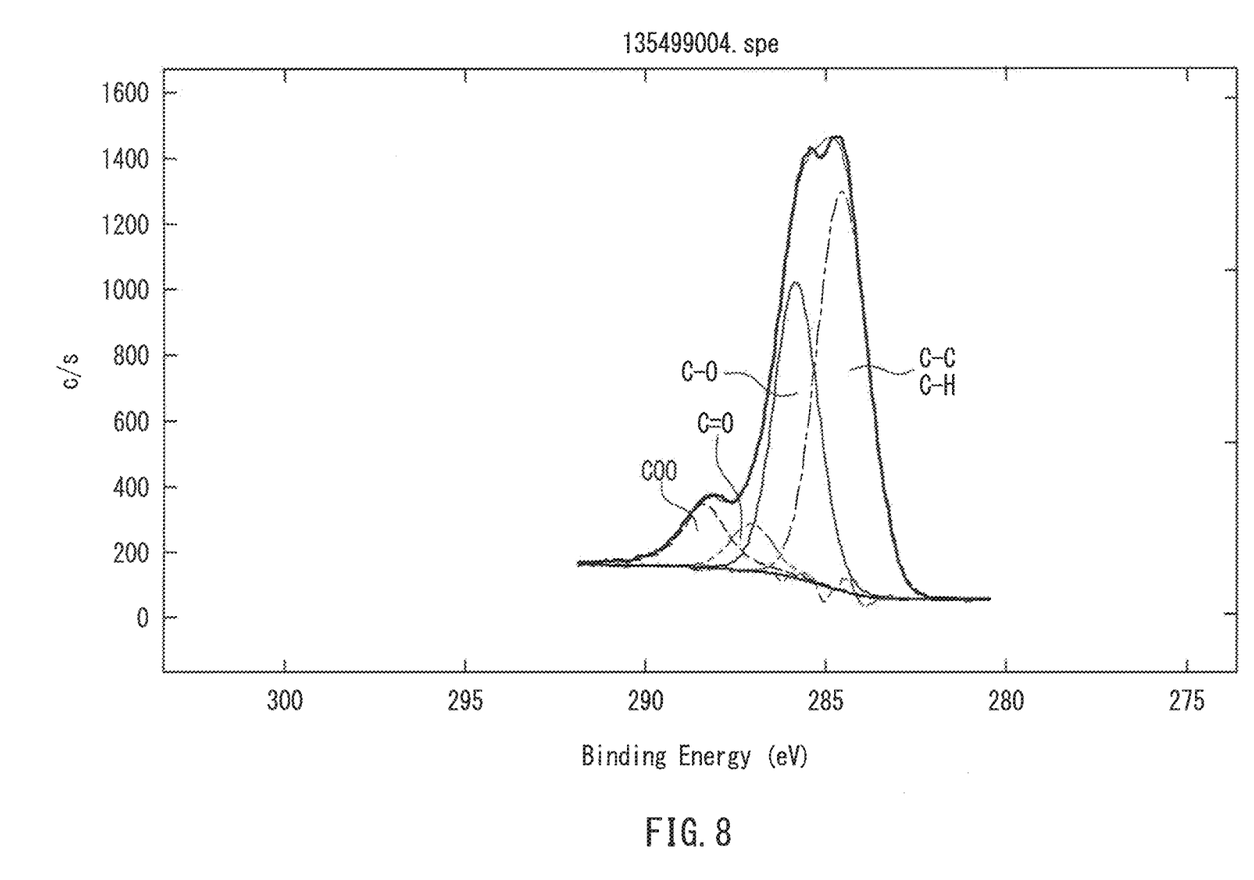
FIG. 8 is analysis data of C1s spectra of the product of Example 2 of the present invention measured by X-ray photoelectron spectroscopy.

(3) To examine changes in chemical states of the respective specimens in detail, the peaks of the C1s spectra were separated. FIGS. 6 to 8 show the obtained results. Further, the constitution ratio of the respective components was calculated from an area ratio of the respective peaks. Table 1 shows the surface atom concentrations and the percentages (%) of the carbon atom concentrations of the respective binding states with respect to the total carbon atom concentrations.

TABLE 1

| Specimen | Atom Binding state | COO | C=O | C—O C—O—C | C—C C—H | O |
|---|---|---|---|---|---|---|
| Comparative Example 1 Untreated | Atom concentration (at %) | ND | 2.5 | 73.1 41.9 | 28.7 | 26.9 |
| | Percentage (%) of carbon atom concentration | 0.0 | 3.4 | 57.3 | 39.3 | — |
| Example 1 Ozone oxidation treatment | Atom concentration (at %) | 7.9 | 4.2 | 65.3 33.2 | 20.0 | 34.7 |
| | Percentage (%) of carbon atom concentration | 12.1 | 6.4 | 50.9 | 30.6 | — |
| Example 2 Excimer treatment | Atom concentration (at %) | 6.9 | 4.3 | 73.9 25.0 | 37.7 | 26.1 |
| | Percentage (%) of carbon atom concentration | 9.4 | 5.8 | 33.8 | 51.0 | — |

FIGS. 4 to 8 and Table 1 indicate the following.

(1) Product of Comparative Example 1:

The percentage of C—O was about two times greater than the concentration of O, and the calculated binding energy of C—O was 1.7 eV higher than that of the binding components of C—C, C—H. Therefore, this product contained a large amount of the binding state C—O—C (epoxy group).

(2) Product of Example 1:

As compared with the product of Comparative Example 1, the ester bond (—COO—) increased*[1], while the binding state C—O—C (epoxy group) decreased.

Note (*[1]) In the products of Examples 1-2, it is difficult to differentiate between COO—H (carboxyl group) and COO—C (ester bond) from the C1s spectra. Assuming that the detected COO component is COO—H (carboxyl group), the amount of O is too low even when the binding component of C—O is all C—O—C. Therefore, the detected COO component was judged as the binding state COO—C (ester bond).

(3) Product of Example 2:

As compared with the product of Comparative Example 1, the ester bond (—COO—) increased, while the binding state C—O—C (epoxy group) decreased further from the product of Example 1.

(4) From the above, it is considered*[2] that the component of the ester bond (—COO—) was detected from the products of Examples 1-2, and the amount of C—O—C (epoxy group) decreased in the order of Product of Comparative Example 1>Product of Example 1>Product of Example 2.

Note (*[2]) It is reported that the binding energy of C—O—C (epoxy group) is higher than that of C—O by about 0.5 eV. However, since these binding energies are close to each other, these components could not be separated in this peak separation analysis. As to differences in binding energy between the binding components of C—O, C—O—C and the binding components of C—C, C—H, the product of Comparative Example 1, the product of Example 1, and the product of Example 2 were +1.7, 1.4, and 1.3 eV, respectively. Therefore, it can be understood that the change in binding energy was due to a decrease in the ratio of the C—O—C (epoxy group) component.

Next, the carbon fibers obtained in Comparative Example 1 and Examples 1-2 were subjected to the fiber reinforcement resin impregnation test. Table 2 shows the results.

TABLE 2

| Time (min) | Comparative Example 1 (Untreated) (Impregnated area %) | Example 1 (Ozone oxidation treatment) (Impregnated area %) | Example 2 (Excimer treatment) (Impregnated area %) |
|---|---|---|---|
| 0 | 0 | 0 | 0 |
| 5 | 15.4 | 17.7 | 19.2 |
| 10 | 28.0 | 59.0 | 68.4 |

Resin impregnation speeds (impregnated area per time) of the respective carbon fibers were calculated from Table 2 using a least-squares method. As compared with the resin impregnation speed of Comparative Example 1 (untreated), the resin impregnation speeds of the carbon fibers of Example 1 (ozone oxidation treatment) and Example 2 (excimer treatment) were increased by about 1.9 times and 2.2 times, respectively.

It was confirmed from the above Examples and Comparative Example that the presence of the ester bond (—COO—) generated by denaturation of the epoxy resin sizing agent on the surface of the carbon fibers to which the epoxy resin sizing agent was applied enhanced wettability to a matrix resin, thereby allowing the matrix resin to be impregnated between the fibers easily.

Examples 3 to 8, Comparative Example 2

(1) Carbon Fibers

The following carbon fibers manufactured by Mitsubishi Rayon Co., Ltd. were used: product number: PYROFIL (registered trademark) TRH50 60M, shape: large tow filament, single fiber fineness: 6 μm. As the sizing agent, an epoxy-based compound was applied to the carbon fibers.

(2) Surface Treatment of Carbon Fibers (a) Excimer Lamp Irradiation Treatment

The following two kinds of excimer lamps were used.

(a-1) Excimer lamp (energy wavelength: 172 nm)

Maker: USHIO Inc.

Lamp: xenon

Model: H0011

Light intensity: 5.5 mW/cm$^2$ (measured value)

With or without ozone oxidation can be set by adjusting a gap between a quartz glass and an object to be treated. If there is a gap therebetween, oxygen in air absorbs light energy, whereby ozone is generated. The lamp and the object to be treated were partitioned by a window plate. The lamp side was under nitrogen gas, while the object side was under air. The treatment was performed both in the case where a distance (gap) from the window plate was 0 mm (contact closely with the window plate) and in the case where a distance from the window plate was 0.5 to 1 mm. Table 1 shows the light intensity and the treatment time.

(a-2) Excimer lamp (energy wavelength: 222 nm)
Maker: M.D.Excimer, Inc.
Lamp: krypton chlorine
Model: MEIR-1-200-222-K
Light intensity: 53 mW/cm$^2$ (measured value)
The lamp and the object to be treated were under air.

(b) Low—Pressure Mercury Lamp Irradiation Treatment
A low-pressure mercury lamp irradiation device manufactured by SEN LIGHTS Co., Ltd., model: UVL10D (energy wavelengths: 185 nm, 254 nm) was used. Table 1 shows the light intensity and the treatment time. The low-pressure mercury lamp emits two kinds of emission spectra at 185 nm and 254 nm simultaneously. The spectrum of 185 nm generates ozone. The lamp and the object to be treated were under air.

(c) Ozone Oxidation Treatment
Oxygen was supplied from an oxygen tank to the following ozone gas generators to produce ozone. The single fibers were subjected to the ozone oxidation treatment by placing the fibers in a certain enclosed space and exposing them to an ozone atmosphere. The ozone production capacity was about 6 g/h in total using three ozone generators each unit having an ozone production capacity of 2.16 g/h (voltage: 100V, oxygen gas concentration: 90%, flow rate: 1 L/min).
Ozone generator
Maker: REGAL JOINT Co., Ltd.
Model: ORZ-3.2
Production method: silent discharge
Ozone concentration: 40000 ppm (d) Plasma Treatment
Maker: Sekisui Chemical Co., Ltd.
System: Pulsed plasma system original to Sekisui Chemical Co., Ltd. (In the pulsed plasma system, wettability and coherence are improved by efficiently utilizing radicals produced in a plasma space by a pulsed power source under atmospheric pressure plasma generated by any gas).
The object to be treated was subjected to the plasma treatment by passing through plasma generated under an atmosphere of nitrogen gas and an atmosphere of nitrogen+ oxygen gas, at a constant speed. Table 1 shows the watt density and the treatment time.

(3) Measurement of Dynamic Contact Angle between Carbon Fibers and Water

Based on the idea that the matrix resin impregnation property of the carbon fibers is correlated with an affinity of carbon fibers for water, dynamic contact angles between the carbon fibers and water were measured. The used measurement device and the measurement method were as follows.

(a) Measurement Device (tensiometer)
Maker: Biolin Scientific Holding AB (distributor in Japan: Altech Co., Ltd.)
Measurement Device: Sigma 700

(b) Measurement Method
Dynamic contact angles (advancing and receding contact angles) of the single carbon fibers were calculated by measuring hysteresis. First, ten single fibers were aligned in parallel and attached to an aluminum foil, next vertically and simultaneously immersed in water (distilled water) to a predetermined depth, and then pulled out. This operation was repeated five cycles. The hysteresis of the five cycles was measured, and advancing and receding contact angles were calculated.

(c) Measurement Conditions
Speed up: 5 mm/min
Speed down: 5 mm/min
Start depth: −1 mm
Immersion depth: 3 mm
Ignore first: 0 mm
Wait when up: 0 sec
Wait when down: 0 sec
Sample interval: 0 sec
Detect range: 5 mN/m
Return position: 5 mm
Return speed: 40 mm/min
R (perimeter) *in terms of 10 fibers: 0.19 mm (d) Calculation Method
The advancing and receding contact angles were calculated by the hysteresis measurement and the following formula:

$$\text{Wetting force} = \gamma LVR \cos \theta$$

($\gamma LV$: surface tension of solution, R: perimeter of specimen, $\theta$: contact angle)

Incidentally, calculation software is incorporated in the tensiometer.

Table 3 summarizes the results of Examples 3 to 8. In Comparative Example 2, carbon fibers with no surface treatment were used.

TABLE 3

| | | | | | Dynamic contact angle (degree) | | | |
|---|---|---|---|---|---|---|---|---|
| | Treatment method | Light intensity mW/cm$^2$ | Watt density W·min/m$^2$ | Condition | Advancing | Difference with Comparative Example 2 (untreated) | Receding | Difference with Comparative Example 2 (untreated) |
| Comparative Example 2 | Untreated | — | — | — | 66 | — | 26 | — |
| Example 3 | Excimer lamp irradiation treatment (Wavelength: 172 nm) (Gap: 0 mm) | 5.5 | — | Irradiation time: 0.5 min | 44 | 22 | 1 | 25 |
| | | | | Irradiation time: 5 min | 30 | 36 | 15 | 11 |
| | | | | Irradiation time: 30 min | 47 | 19 | 6 | 20 |
| Example 4 | Excimer lamp treatment (Wavelength: 172 nm) (Gap: 0.5 to 1 mm) | 5.5 | — | Irradiation time: 0.5 min | 54 | 12 | 1 | 25 |
| | | | | Irradiation time: 5 min | 26 | 40 | 0 | 26 |
| | | | | Irradiation time: 30 min | 46 | 20 | 0 | 26 |

TABLE 3-continued

|  | Treatment method | Light intensity mW/cm² | Watt density W·min/m² | Condition | Dynamic contact angle (degree) | | | |
|---|---|---|---|---|---|---|---|---|
|  |  |  |  |  | Advancing | Difference with Comparative Example 2 (untreated) | Receding | Difference with Comparative Example 2 (untreated) |
| Example 5 | Excimer lamp irradiation treatment (Wavelength: 222 nm) | 53 | — | Irradiation time: 5 min | 51 | 15 | 2 | 24 |
|  |  |  |  | Irradiation time: 30 min | 47 | 19 | 0 | 26 |
| Example 6 | Low-pressure mercury lamp irradiation treatment (Wavelengths: 185 nm, 254 nm) | 51 | — | Irradiation time: 0.5 min | 65 | 1 | 12 | 14 |
|  |  |  |  | Irradiation time: 5 min | 56 | 10 | 15 | 11 |
|  |  |  |  | Irradiation time: 30 min | 42 | 24 | 1 | 25 |
| Example 7 | Ozone oxidation treatment | — | — | Contact time: 5 min | 28 | 38 | 0 | 26 |
|  |  |  |  | Contact time: 30 min | 33 | 33 | 7 | 19 |
| Example 8 | Plasma treatment | — | 38,000 | N₂ gas, rate: 0.05 m/min | 49 | 17 | 0 | 26 |
|  |  |  | 1,900 | N₂ gas, rate: 1 m/min | 64 | 2 | 26 | 0 |
|  |  |  | 38,000 | N₂ + O₂ gas, rate: 0.05 m/min | 48 | 18 | 0 | 26 |
|  |  |  | 1,900 | N₂ + O₂ gas, rate: 1 m/min | 63 | 3 | 16 | 10 |

As is clear from Table 3, the dynamic contact angle with water was reduced by subjecting the carbon fibers to which the sizing agent was applied to ozone oxidation, excimer lamp irradiation, low-pressure mercury lamp irradiation, or plasma treatment. This means that the sizing agent on the surface of the carbon fibers was activated, and the wettability of the fibers to a matrix resin was enhanced. Thus, carbon fibers that allow a matrix resin to be impregnated between the fibers easily could be obtained.

Next, the resin impregnation property was evaluated using carbon fibers that were subjected to surface treatment in the same manner as described above.

(1) Evaluation Samples

Treated and untreated carbon fibers (opened yarns) opened in a strip shape were prepared. The treated carbon fibers were prepared by placing carbon fibers in a desiccator and, after creating a vacuum, bringing them into contact with an ozone atmosphere (concentration: 40000 ppm) for 30 minutes. The opened yarns had a weight per unit area of about 94 g/m².

(2) Evaluation Method

The untreated opened yarns and the ozone-treated opened yarns were each arranged in a size of about 200 mm wide and 230 mm long on a glass plate to form a sheet, and 30 sheets thereof were stacked in the same direction to prepare a base having a weight per unit area of about 2820 g/m². In accordance with ordinary infusion molding shown in FIG. 3, a glass plate 11 was surrounded by sealants 14a and 14b. A separation film 13, a media sheet 15, and a film 16 were stacked on a base 12 and sealed. Evacuation was performed from an outlet 19 provided on one side in a length direction to an arrow direction 20 at a constant vacuum, and a matrix resin 17 was caused to flow therein from a supply port 18 on the other side. A resin impregnated area (%) in accordance with the lapse of time was observed from the undersurface of the glass plate 11.

Matrix Resin: epoxy-based resin (manufactured by Huntsman International LLC.)
Main Agent: Araldaite LY1564SP: 100 parts by weight
Curing Agent: Aradur 3416: 34 parts by weight
The above ingredients were mixed (viscosity: 200 to 320 mPa·s (25° C.)).

(3) Results

Figure 9:
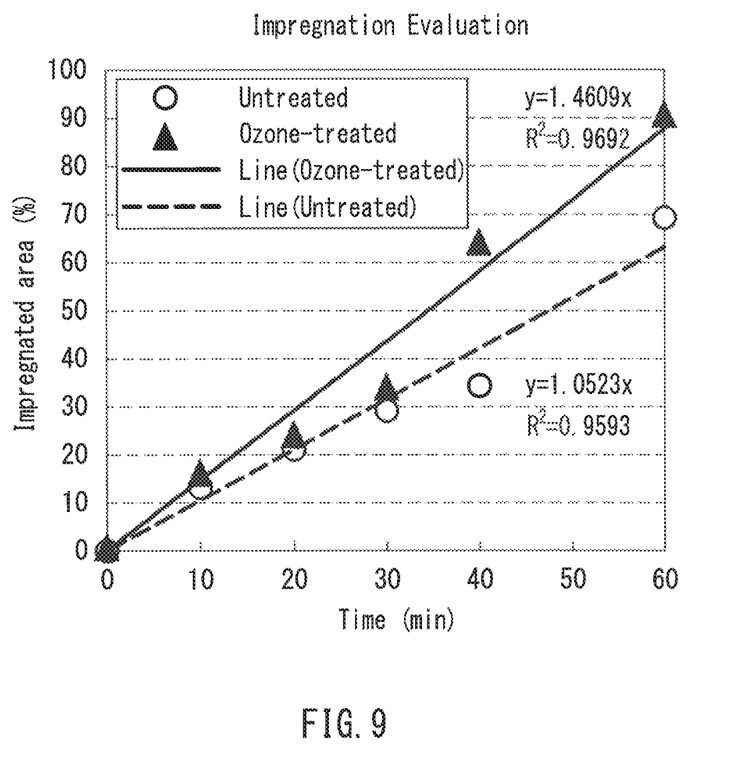
FIG. 9 is a graph showing a resin impregnation property in another example of the present invention.

According to the measurement of the spread of the resin impregnated area, the resin impregnation speed of the ozone-treated carbon fibers was increased by about 40% as compared with that of the untreated carbon fibers (see Table 4 and FIG. 9).

TABLE 4

|  | Resin impregnated area (%) | |
|---|---|---|
| Time (min) | Untreated | Ozone |
| 0 | 0 | 0 |
| 10 | 13.3 | 16.1 |
| 20 | 21.3 | 23.8 |
| 30 | 29.2 | 33.7 |
| 40 | 34.1 | 63.8 |
| 60 | 69.1 | 90.7 |

Next, mechanical characteristics of the carbon fiber-reinforced resin formed by impregnation were measured, and the mechanical characteristics of the untreated product and the ozone treated product were compared. The mechanical characteristics measured herein include a fiber volume content, a deflection temperature under load, tensile characteristics (stress, elastic modulus, elongation at break), bending characteristics (stress, elastic module), and compression characteristics (stress, elastic modulus, elongation at break).

As a result, the mechanical characteristics of the carbon fiber-reinforced resin formed from the ozone-treated carbon fibers were not different from those of the untreated product (see Table 5).

TABLE 5

| Item | Unit | Standard | Untreated product | Ozone-treated product |
|---|---|---|---|---|
| Fiber volume content | % | ISO 11667 | 54 | 53 |
| Deflection temperature under load | ° C. | ISO 75-2 | 71 | 70 |
|  |  |  | (Bending Stress: 110 MPa) | |

TABLE 5-continued

| Item | | Unit | Standard | Untreated product | Ozone-treated product |
|---|---|---|---|---|---|
| Tensileness | Stress | MPa | ISO 527-4/5 | 1,446 | 1,587 |
| | Elastic modulus | GPa | | 125 | 122 |
| | Elongation at break | % | | 1.1 | 1.2 |
| Bending | Stress | MPa | ISO 14125 A | 1,100 | 1,100 |
| | Elastic modulus | GPa | | 95 | 92 |
| Compression | Stress | MPa | JIS K 7076 | 900 | 900 |
| | Elastic modulus | GPa | | 110 | 110 |
| | Elongation at break | % | | 1.4 | 1.5 |

Examples 9 to 14, Comparative Example 3

Next, the surface treatment of glass fibers was tested.
(1) Glass Fibers
The following glass fibers manufactured by Owens Corning were used: product number: Advantex T30, shape: direct roving, single fiber fineness: 17 μm. As the sizing agent, an epoxy silane-based compound was applied to the glass fibers.
(2) Surface Treatment of Glass Fibers
The glass fibers were subjected to the surface treatment in the same manner as the carbon fibers of Examples 3 to 8.
(3) Measurement of Dynamic Contact Angle between Glass Fibers and Water
Regarding the glass fibers, five single fibers were aligned in parallel and attached to an aluminum foil for measurement. The R (perimeter: length of circumference) in terms of five fibers was 0.27 mm. The other measurement conditions were the same as those of the carbon fibers. Table 6 shows the results.

activated, whereby glass fibers that allow a matrix resin to be impregnated between the fibers easily could be obtained.

INDUSTRIAL APPLICABILITY

The carbon fiber-reinforced resin of the present invention can be applied widely to, e.g., blades for wind power generation, various sporting goods such as golf club shafts and fishing rods, airplanes, automobiles, pressure vessels, etc.

DESCRIPTION OF REFERENCE NUMERALS 1-6 carbon fibers or glass fibers
7 knitting needle
8, 9 stitching yarns
10 fiber sheet
11 glass plate
12l base
13 separation film

TABLE 6

| | Treatment method | Light intensity mW/cm$^2$ | Watt density W · min/m$^2$ | Condition | Dynamic Contact Angle (degree) | | | |
|---|---|---|---|---|---|---|---|---|
| | | | | | Advancing | Difference with Comparative Example 3 (untreated) | Receding | Difference with Comparative Example 3 (untreated) |
| Comparative Example 3 | Untreated | — | — | — | 74 | — | 25 | — |
| Example 9 | Excimer lamp irradiation treatment (Wavelength: 172 nm) (Gap: 0 mm) | 5.5 | — | Irradiation time: 0.5 min | 67 | 7 | 3 | 22 |
| | | | | Irradiation time: 1 min | 43 | 31 | 0 | 25 |
| | | | | Irradiation time: 5 min | 34 | 40 | 15 | 10 |
| Example 10 | Excimer lamp treatment (Wavelength: 172 nm) (Gap: 0.5 to 1 mm) | 5.5 | — | Irradiation time: 0.5 min | 53 | 21 | 6 | 19 |
| | | | | Irradiation time: 1 min | 48 | 26 | 2 | 23 |
| | | | | Irradiation time: 5 min | 27 | 47 | 0 | 25 |
| Example 11 | Excimer lamp irradiation treatment (Wavelength: 222 nm) | 53 | — | Irradiation time: 0.5 min | 72 | 2 | 1 | 24 |
| | | | | Irradiation time: 1 min | 73 | 1 | 10 | 15 |
| | | | | Irradiation time: 5 min | 49 | 25 | 1 | 24 |
| Example 12 | Low-pressure mercury lamp irradiation treatment (Wavelengths: 185 nm, 254 nm) | 51 | — | Irradiation time: 0.5 min | 72 | 2 | 17 | 8 |
| | | | | Irradiation time: 1 min | 72 | 2 | 15 | 10 |
| | | | | Irradiation time: 5 min | 56 | 18 | 5 | 20 |
| Example 13 | Ozone oxidation treatment | — | — | Contact time: 0.5 min | 72 | 2 | 8 | 17 |
| | | | | Contact time: 1 min | 70 | 4 | 14 | 11 |
| | | | | Contact time: 5 min | 63 | 11 | 16 | 9 |
| Example 14 | Plasma treatment | — | 38,000 | $N_2$ gas, rate: 0.05 m/min | 55 | 19 | 0 | 25 |
| | | | 1,900 | $N_2$ gas, rate: 1 m/min | 71 | 3 | 10 | 15 |
| | | | 380 | $N_2$ gas, rate: 5 m/min | 73 | 1 | 13 | 12 |
| | | | 38,000 | $N_2 + O_2$ gas, rate: 0.05 m/min | 36 | 38 | 0 | 25 |
| | | | 1,900 | $N_2 + O_2$ gas, rate: 1 m/min | 67 | 7 | 0 | 25 |
| | | | 380 | $N_2 + O_2$ gas, rate: 5 m/min | 71 | 3 | 2 | 23 |

As is clear from Table 6, the surface-treated glass fibers had a smaller dynamic contact angle with water. This means that the sizing agent on the surface of the glass fibers was 14a, 14b sealants
15 media sheet
16 film

17 matrix resin
18 supply port
19 outlet

The invention claimed is:

1. A method for producing fibers for fiber-reinforced resin, comprising:
   subjecting fibers to which 0.1 to 5.0% by weight of a sizing agent is adhered to ozone oxidation so as to denature the sizing agent and generate an ester bond (—COO—) so that a carbon atom concentration of the ester bond (—COO—) is 7.0% or more with respect to a total carbon atom concentration of the sizing agent, thereby increasing a matrix resin impregnation property of the fibers,
   wherein the fibers are at least one selected from carbon fibers and glass fibers.

2. The method for producing fibers for fiber-reinforced resin according to claim 1, wherein the fibers are aligned in at least one direction.

3. The method for producing fibers for fiber-reinforced resin according to claim 1, wherein the fibers are formed into a sheet shape.

4. The method for producing fibers for fiber-reinforced resin according to claim 1, wherein the sizing agent is an epoxy-based resin.

5. The method for producing fibers for fiber-reinforced resin according to claim 1, wherein an advancing contact angle or a receding contact angle of a dynamic contact angle of the fibers for fiber-reinforced resin is lower than that of an untreated product.

6. The method for producing fibers for fiber-reinforced resin according to claim 1, wherein the fibers are carbon fibers.

7. The method for producing fibers for fiber-reinforced resin according to claim 6, wherein the carbon fibers are filaments.

\* \* \* \* \*